United States Patent [19]

Roe, Jr.

[11] 4,303,600

[45] Dec. 1, 1981

[54] REACTOR COLUMN

[75] Inventor: Sheldon F. Roe, Jr., Cape Coral, Fla.

[73] Assignee: The Munters Corporation, Ft. Myers, Fla.

[21] Appl. No.: 223,347

[22] Filed: Jan. 8, 1981

[51] Int. Cl.³ .............................................. B01F 3/04
[52] U.S. Cl. .................................. 261/112; 156/184;
    156/195; 202/158; 261/94; 261/DIG. 72
[58] Field of Search ..................................... 261/94–98,
    261/112, DIG. 11, DIG. 72; 156/184, 187, 195;
    202/158; 210/150; 422/310, 312

[56] References Cited

U.S. PATENT DOCUMENTS

| | | | |
|---|---|---|---|
| 2,639,130 | 5/1953 | Heere | 261/112 X |
| 3,318,586 | 5/1967 | Meredith | 261/DIG. 11 |
| 3,385,179 | 5/1968 | Roe, Jr. | 156/195 X |
| 3,450,393 | 6/1969 | Munters | 261/112 |
| 3,466,151 | 9/1969 | Sicard et al. | 261/95 X |
| 3,574,032 | 4/1971 | Norback et al. | 261/112 X |
| 3,785,620 | 1/1974 | Huber | 261/112 X |
| 3,947,532 | 3/1976 | Skold et al. | 261/112 |
| 4,065,341 | 12/1977 | Cub | 156/187 |
| 4,184,946 | 1/1980 | Kato | 261/DIG. 72 |
| 4,228,847 | 10/1980 | Lindahl | 156/187 X |

FOREIGN PATENT DOCUMENTS

| | | | |
|---|---|---|---|
| 860689 | 2/1961 | United Kingdom | 202/158 |
| 676304 | 7/1979 | U.S.S.R. | 261/112 |

Primary Examiner—Richard L. Chiesa
Attorney, Agent, or Firm—Curtis, Morris & Safford

[57] ABSTRACT

A reactor column is disclosed which consists of a plurality of blocks of contact body material formed of cross-corrugated sheets, with the blocks being stacked one upon the other in superimposed relation to define a column having sides and upper and lower ends. A plastic film is wrapped about the sides of the column and tightly engaged therewith to form a self-supporting reactor column suitable for use in distillation processes.

11 Claims, 7 Drawing Figures

FIG.4
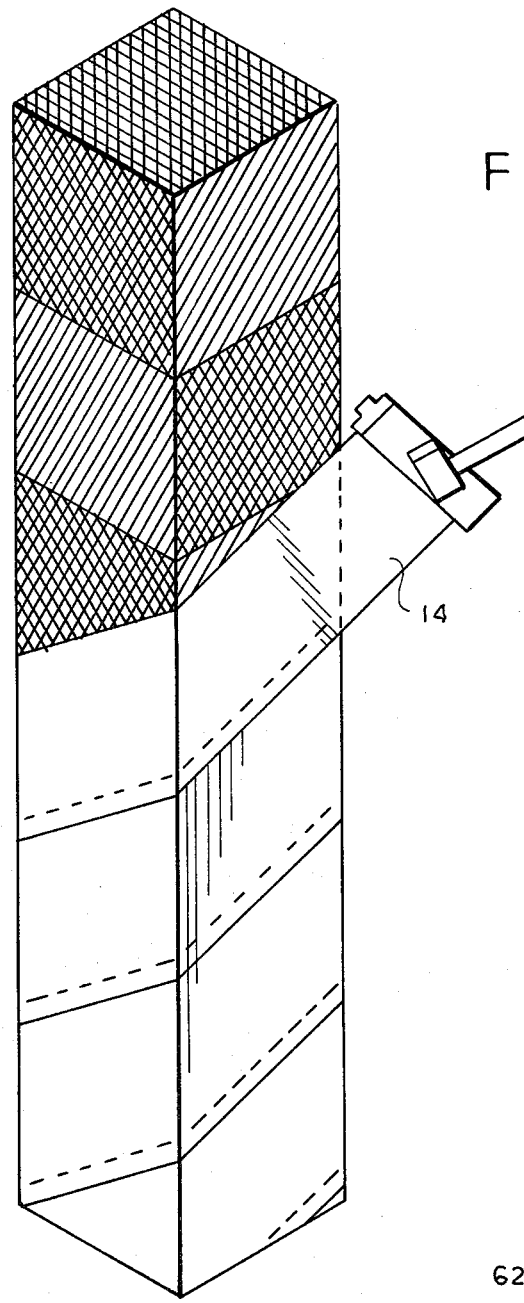
FIG.6
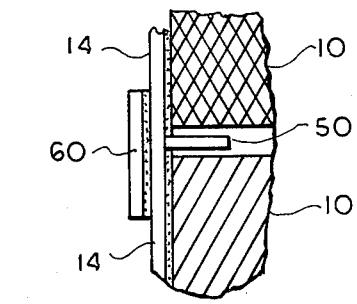
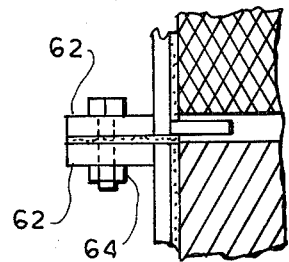
FIG.7

REACTOR COLUMN

The present invention relates to reactor columns and more in particular to a self-supporting reactor column such as a distillation column.

Reactor columns such as might be used in distillation procedures for the production of ethanol and similar chemicals typically consist of an outer shell which may be a pipe, a pressure vessel, filament wound fiberglass or the like, packed with a fill material consisting of Intalox saddles, pall rings, sieve trays, or valve trays. Typically, the shel is a self-supporting structure, which is highly reinforced and very expensive to manufacture. Thus, when the interior of the shell, particularly the fill material, becomes contaminated or filled with dirt particles, the column is emptied of the fill material and cleaned. This is a relatively expensive and time consuming process, that leads to a substantial down time for the entire chemical process.

It is an object of the present invention to provide an inexpensive reactor column, which can be completely replaced and disposed of rather than periodically cleaned.

Another object of the present invention is to provide a lightweight self-supporting reactor tower.

A further object of the present invention is to provide a lightweight reactor tower utilizing high efficiency and low pressur drop fill in a self-supporting structure.

A still further object of the present invention is to produce a vacuum distillation column utilizing the compressive strength of the fill material as a structural element of the column.

Another object of the present invention is to provide a reactor column which is relatively inexpensive to manufacture.

In accordance with an aspect of the present invention, a reactor column such as, for example, a distillation column, used in the production of ethanol and similar chemicals is formed from a plurality of blocks of contact material positioned in superimposed stacked relationship with each other. These blocks are formed of a plurality of corrugated sheets of material wherein all of the corrugations of each sheet are disposed at an angle to the horizontal and extend continuously in substantially straight lines from one edge of the sheets to another edge thereof with the corrugations in alternate sheets crossing the corrugations in the sheets disposed between the alternate sheets. A plastic film is wrapped about and tightly engages the blocks to form a self-supporting column wherein the fill material itself forms a structural portion of the column.

The above, and other objects, features, and advantages of this invention will be apparent in the following detailed description of an illustrative embodiment of the present invention to be read in connection with the accompanying drawings wherein:

FIG. 4 is a perspective view similar to FIG. 3 showing the extrusion of the plastic film during the wrapping operation;

FIG. 6 is a sectional view similar to FIG. 5 showing a joint between two adjacent columns; and FIG. 7 is a sectional view similar to FIG. 6 showing another form of joint.

Figure 1:
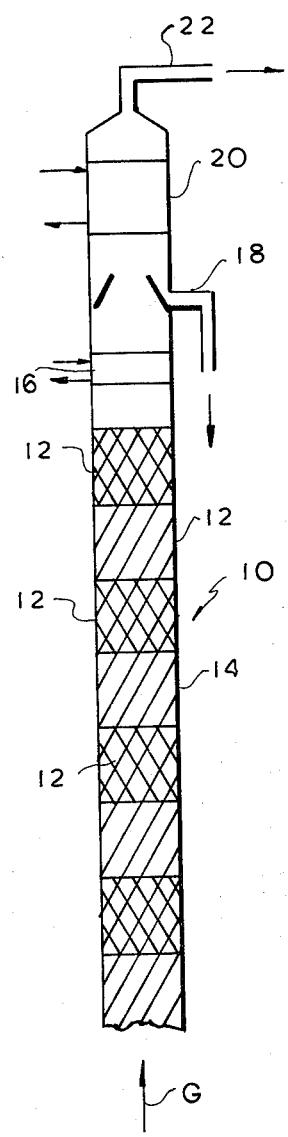
FIGS. 1 and 2 are schematic side sectional views of reaction columns constructed in accordance with the present invention.
Figure 2:
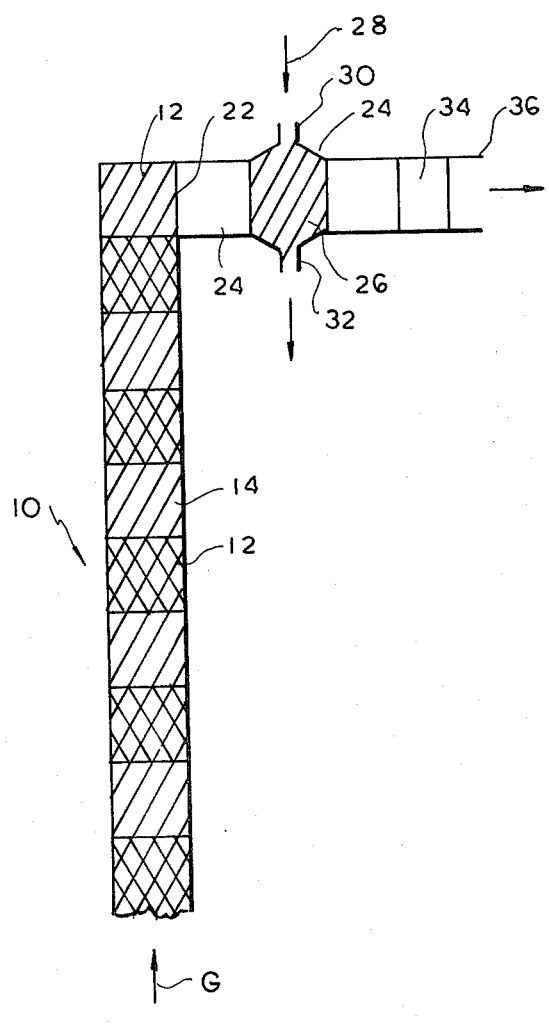

Referring now to the drawings in detail, and initially to FIGS. 1 and 2 thereof, a reaction column 10 is schematically illustrated which is constructed in accordance with the present invention. The column consists of a plurality of blocks 12 of fill material wrapped by a plastic wrapping 14 in a tight relationship, so that the fill material forms a structural component of the column.

Preferably, the individual blocks 12 of fill material each consist of a block, for example, a one foot cube, of PLASdek packing materials sold by the Munters Corporation. This material is formed from corrugated sheets of high temperature thermoplastics such as Noryl 265, with all of the corrugations in each sheet being disposed at an angle to the horizontal and with each of the corrugations extending continuously on substantially straight lines from one edge of the sheet to another edge thereof. The corrugations in alternate sheets cross the corrugations in the sheets disposed between the alternate sheets in a cross-fluted arrangement. A plurality of these individual blocks 12 are stacked upon one another, as illustrated in FIG. 1. The sheets in one block 12 are disposed perpendicularly to the sheets in the adjacent blocks 12 to provide a more circuitous flowpath for gases G rising from the base of the column through the fill material.

While Plasdek fill by Munters has been specifically described for use in the present invention, it is contemplated that other types of Munters fill made of stainless steel or with glass fibers and sold under the trademark "GLASdek" could also be advantageously used in the invention.

In the embodiment of the invention illustrated in FIG. 1, tower 10 is secured at its upper end to a condenser 16 of conventional construction through which gases rising in the column flow. A condensate discharge opening 18 is provided in the side of the tower before a second condenser 20. Vapor passing from the second condenser passes out of the top of the column through an outlet pipe 22 or the like.

A similar reaction column 10 is illustrated in FIG. 2. This column again consists of a plurality of blocks of fill material 12 wrapped with a plastic wrapping 14. Vapor G enters the base of the column and is discharged through the top block 12 of fill material from the side thereof. This is permissible with the use of blocks formed of Munters fill as described above, because of the cross-fluted corrugations therein. The side discharge opening 22 formed in the column leads through a duct 24 to a solvent chamber 24 which also contains a block 26 of Munters fill. Refrigerated solvent 28 is introduced into chamber 24 through a port 30 and is discharged from the chamber under the influence of gravity with condensate collected in the fill material through a discharge port 32. From there the vapor passes through a conventional mist eliminator 34 before passing out of the system through the discharge conduit 36.

Figures 3, 5:
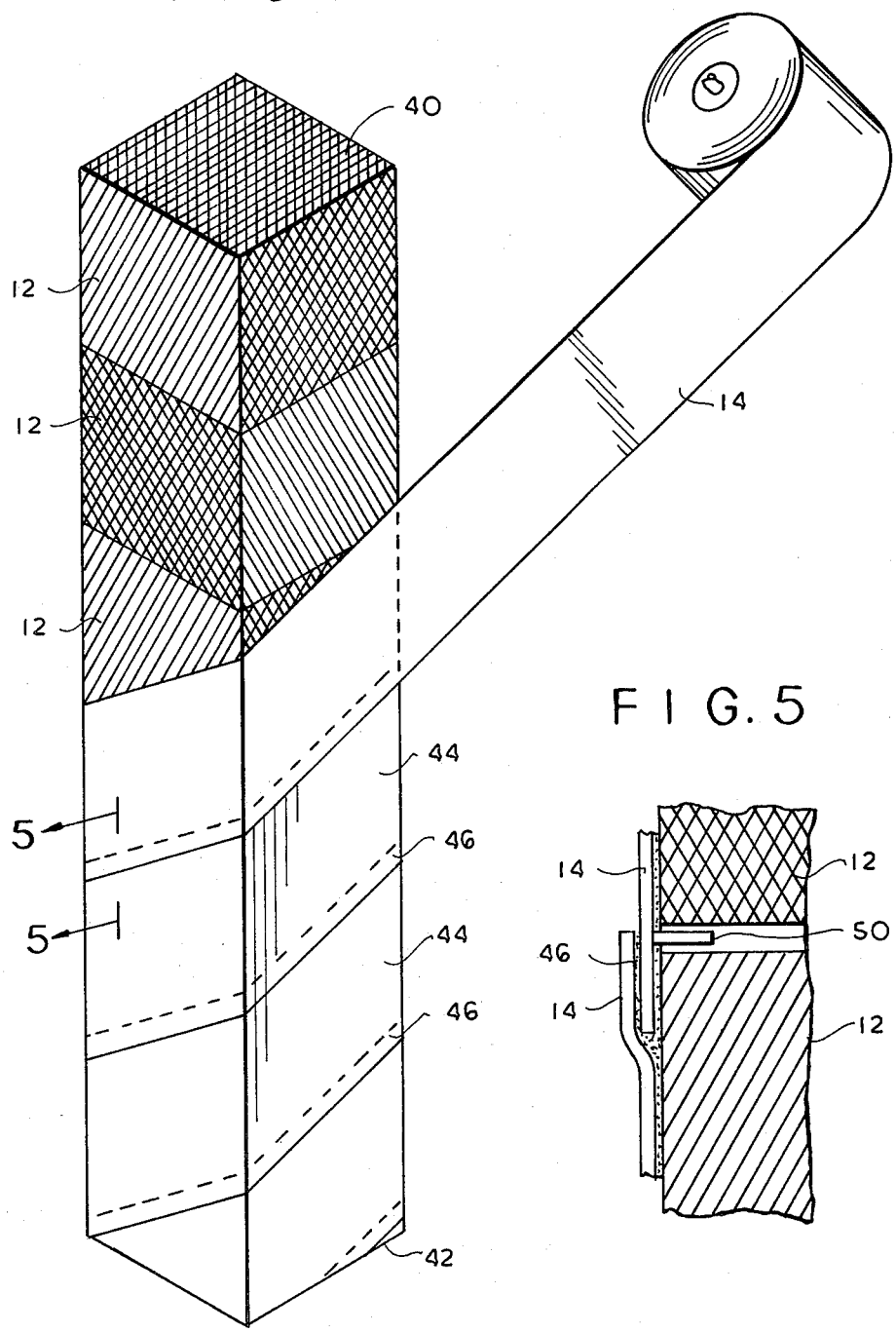
FIG. 3 is an enlarged perspective view showing a reaction column of the present invention while it is being wrapped with a plastic film.
FIG. 5 is a sectional view taken along line 5—5 of FIG. 3 showing a joint between adjacent blocks in the column.

Munters fill of the type previously described has a relatively high compressive strength. This feature is used advantageously in accordance with the present invention to produce a self-supporting distillation column. As illustrated in FIG. 3, blocks of fill 12 are stacked one upon another with the sheets in adjacent stacks positioned perpendicularly to each other, but with the blocks in superimposed vertical stacked relationship. This defines a column having four sides as well as upper and lower ends 40, 42, respectively. The self-supporting column is completed by wrapping the sides of the column with a plastic film such as, for example, Noryl 265 plastic. This film may be preformed and wrapped about the tower using a device such as disclosed in U.S. Pat. No. 3,385,179. During the wrapping operation, the blocks 12 would be clamped together between a pair of pressure plates or the like, to hold and stabilize their relationship while they are being wrapped.

The spiral windings 44 of the plastic layer form convlutions hich have slight overlaps 46 therein. The convolutions of the plastic wrap are secured together to form an integral skin for the column by the use of a high temperature heat softenable plastic material extruded therebetween, as taught in the above-mentioned patent, or by the use of any convenient adhesive. Alternatively, the plastic film 14 may have its inner surface coated with an adhesive, as also taught in the above-mentioned patent, prior to application on the sides of the column. The wrapping against the column is a tight wrapping, so that the plastic skin is placed in tension and the fill material is placed under the effects of compressive forces. This combination of a tensioned skin and a compressed interior provided sufficient structural strength to the column to enable it to be self-supporting.

In another embodiment of the invention, illustrated in FIG. 4, the plastic film 14 is extruded in any convenient manner and applied immediately to the surface of the blocks 12. This sheet may be extruded by any commercially available machine, such as, for example, the extruders sold under the tradename "KILLION".

The plastic used to wrap the column is preferably a heat shrinkable plastic material. With this type of material, after the column is wrapped, it can be subject to heat treatment in order to shrink the plastic more tightly against the blocks of fill. This tightly holds the blocks together in the stacked relationship, and produces the desired structural strength.

It is noted that although a spiral type wrapping has been shown in FIGS. 3 and 4 of the drawings, the angle of wrapping is not believed to be critical, and the wrappings may be a more shallow wrapping almost substantially perpendicular to the longitudinal axis of the column.

In the formation of the column, it has been found preferable to provide peripheral liquid redistribution rings between adjacent blocks of fill material. These rings, as illustrated in FIG. 5, are flat plates 50 located along the peripheral edges of adjacent blocks 12. The rings serve to prevent passage of liquid condensate from one block to another at the extreme outer edges of the blocks. This forces any liquid trapped in the passages 52 in the blocks at these corners to flow into passages leading towards the interior of the block, so that the liquid is again passed to the interior of the next lower adjacent block for redistribution throughout the block. These redistribution rings prevent the accumulation of liquid along the periphery of the column as it passes downwardly through the column.

Although a column having about six blocks of one foot cubes of fill material may be satisfactory, it might occur that taller towers are necessary. In order to join two columns together, a plastic sealing strip 60 may be heat sealed to the outer surfaces of the plastic wrap 14 on two superimposed columns 10, as illustrated in FIG. 6. Preferably, a redistribution ring 50 is also positioned between the ends of the two superimposed columns.

Another form of connecting two columns together is illustrated in FIG. 7. In this case, peripheral flanges 62 are secured to the adjacent ends of the columns in any convenient manner, so that they may be bolted together by bolt and nut assemblies 64 or the like.

By the above-described construction of the present invention, a reaction tower is formed which is relatively light in weight and durable in use. The tower takes advantage of the structural strength of the fill material used in the tower to provide a self-supporting structure. When the clumn fill becomes contaminated the entire column may be withdrawn and replaced with a new column eliminating the need to clean the column fill.

Although an illustrative embodiment of the invention has been described herein with reference to the accompanying drawings it is to be understood that the invention is not limited to that precise embodiment, and that various other changes and modifications may be effected therein by one skilled in the art without departing from the scope or spirit of this invention.

What is claimed is:

1. A reactor column comprising a plurality of blocks of contact body material positioned in superimposed stacked relationship with each of said blocks formed of a plurality of corrugated sheets of material wherein all of the corrugations of each sheet are disposed at an angle to the horizontal and extend continuously in substantially straight lines from one edge of the sheets to another edge thereof with the corrugations in alternate sheets crossing the corrugations in the sheets disposed between the alternate sheets; and a plastic film wrapped about and tightly engaged with said blocks to form a self-supporting reactor column.

2. A reactor column as defined in claim 1 wherein said plastic wrap is spirally wound about said stack of blocks.

3. A reactor column as defined in claim 1 wherein said spirally wound wrap has a plurality of convolutions with adjacent convolutions slightly overlapping.

4. A reactor column as defined in claim 3 wherein said convolutions are adhered to each other at said overlappings.

5. A reactor column as defined in claim 1 wherein said plastic wrap is adhesively secured to said blocks.

6. A reactor column as defined in claim 1 wherein said plastic wrap is heat shrunk about said stack.

7. A reactor column as defined in claim 1 wherein said sheets of said blocks and said wrap are formed of Noryl 265 plastic.

8. A reactor column as defined in claim 1 wherein said plastic wrap is extruded directly on the surfaces of said blocks.

9. A reactor column as defined in claim 8 including liquid impervious liquid distribution rings between adjacent blocks of said contact body material.

10. A reactor column as defined in claim 1 wherein adjacent blocks in said stack are positioned with the sheets therein at right angles to each other.

11. A reactor column comprising a plurality of blocks of contact body material formed of cross corrugated sheets stacked one upon another in superimposed relation to define a column having sides and upper and lower ends; and a plastic film wrapped about the sides of said column and tightly engaged with said blocks to form a self-supporting distillation column.

* * * * *